United States Patent [19]
Harata et al.

[11] Patent Number: 5,864,950
[45] Date of Patent: Feb. 2, 1999

[54] ASSEMBLING PROCESS FOR A RAVIGNAWX TYPE PLANETARY GEAR TRAIN HAVING STEPPED LONG PINIONS

[75] Inventors: Takehito Harata, Nagoya; Yoichi Ikeda, Fuji, both of Japan

[73] Assignees: Aichi Kikai Kogyo Kabushiki Kaisha, Nagoya; JATCO Corporation, Fuji, Japan

[21] Appl. No.: 786,415

[22] Filed: Jan. 21, 1997

[51] Int. Cl.$^6$ ................................................. B21H 5/00
[52] U.S. Cl. ........................... 29/893.1; 29/281.5; 29/464
[58] Field of Search ...................... 29/434, 464, 893.1 R, 29/893.2, 281.1, 281.5

[56] References Cited

U.S. PATENT DOCUMENTS

| | | | |
|---|---|---|---|
| 3,286,335 | 11/1966 | Di Pietrea .................................. | 29/464 |
| 3,724,067 | 4/1973 | Tygard et al. ............................. | 29/464 |
| 3,902,237 | 9/1975 | Benjamin ............................... | 29/893.1 |
| 4,112,786 | 9/1978 | Thomas .................................. | 29/893.1 |
| 4,901,601 | 2/1990 | Leggat .................................... | 29/893.1 |
| 5,442,854 | 8/1995 | Koltookian et al. . | |
| 5,623,754 | 4/1997 | Swann et al. .......................... | 29/281.1 |
| 5,653,928 | 8/1997 | Schnipke . | |

*Primary Examiner*—Frances Han
*Attorney, Agent, or Firm*—Dennison, Meserole, Pollack & Scheiner

[57] ABSTRACT

A method of assembly for a planetary gear train wherein long front gears of stepped long pinions are applied with markings on the end surfaces of tooth forms, the middle grooves of the second and third stepped long pinions are respectively provided with an assembling pin hole in the position at an angle 180 degrees opposite to said markings, and the long rear gear of the first stepped long pinion is provided with a spot facing on the end surface corresponding to the marking, the process comprising preparing an assembling jig composed of carrier-fixing plates at an angular interval of 120 degrees on the center of a boss portion, a spot-facing plate provided in the direction rotated 15 degrees on the center of the support shaft located between said carrier-fixing plates, and control pins supported on pedestals; assembling the stepped long pinions by inserting the control pins into assembling pin holes so that the markings on the second and third stepped long pinions are pointing to the same direction as that of the marking of the first long pinion positioned by the spot facing plate.

4 Claims, 14 Drawing Sheets

ASSEMBLING PROCESS FOR A RAVIGNAWX TYPE PLANETARY GEAR TRAIN HAVING STEPPED LONG PINIONS

BACKGROUND OF THE INVENTION

1. Field of the Invention

The present invention relates to an automatic transmission and particularly to an assembling process for a Ravignawx type planetary gear train having stepped long pinions.

2. Description of the Prior Art

Generally, in the mechanism of this kind of a Ravignawx type planetary gear 1, as shown in FIG. 10, for example, there are provided coaxially an input shaft 2 and an output shaft 3. To the end of the input shaft 2 is fitted a rear sun gear 4, and into the input shaft 2 is inserted a front sun gear 5 through a clutch (not shown). Also, to the output shaft 3 is fitted a carrier 6 havaing a predetermined diameter, and this carrier 6 is provided with three pairs of support shafts 7, 8 in parallel at angular intervals of 120 degrees in the shifted phase around the output shaft 3. To this support shaft 7 is rotatably fitted a short pinion 10 meshing with the front sun gear 5 and a ring gear 9 which is coaxially provided in the outside periphery of the front sun gear 5. Also, to the support shaft 8 is rotatably fitted a long pinion 11 meshing with the short pinion 10 and the rear sun gear 4 commonly.

Recently, this long pinion 11 has been replaced, in view of the reduction gear ratio, with a stepped long pinion 15 comprising a long front gear 16 and a long rear gear 17, as shown in FIG. 1. In this case the long pinion 15 which is rotatably fitted to the shaft 8 of the carrier 6, the long front gear 16 is meshed with and connected to the front sun gear 5 and the ring gear 9 through the short pinion 10 and also the long rear gear 17 is meshed with and connected to the rear sun gear 4, as shown in FIG. 12($a$) and FIG. 12($b$).

In order to accomplish the theoretically proper mesh with this stepped long pinion 15, it is required to satisfy the following conditions:

The condition No. 1 is to select the number of teeth so that the number of teeth of each gear may be in the proper mesh. The formula to select the number of teeth is omitted here.

Next, the condition No. 2 is for the long front gear 16 and long rear gear 17 of the stepped long pinion 15 to be adjusted to the same phase at each center of the tooth width in each one of tooth grooves 16$a$, 17$a$ FIG. 2($a$) to control the relative position of both the gears 16, 17.

Further, as the condition No. 3 it is required to control the relative positions between the mutual long pinions 15 for assembling the stepped long pinions 15 which have satisfied the condition No. 2. For example, as shown in FIG. 13, where the phase-controlled tooth forms are applied with markings M, when the marking M1 is located at an angle of $\phi 1=0$ from the line a1 tying the center of No. 1 stepped long pinion 15A to the center P of the input shaft 2, No. 2 stepped long pinion 15B and No. 3 stepped long pinion 15C must be assembled so that the markings M2, M3 may be located respectively at an angle of $\phi 2=-120$ degrees (240 degrees) from the line a2 and at an angle of $\phi 3=-240$ degrees (120 degrees) from line a3. Incidentally, the plus sign represents the position clockwise from the lines a2, a3, and the minus sign counterclockwise from the same lines, and the calculation of those positions can be obtained by known formulas, but omitted.

If those three conditions are not satisfied, the gears can not be meshed theoretically and can not to be assembled. But in practice there are backlashes in the respective gears, so that in some cases the assembly can be performed even when the above-described three conditions are not satisfied. In those cases, however, there are problems in that the rotation of the gear is lacking in smoothness, the contact between the teeth becomes too tight, and defects such as pitching occurs. Especially, when the condition No. 3 was not satisfied, there was a problem of the failure in meshing, as shown in a circle mark in FIG. 14.

SUMMARY OF THE INVENTION

The object of the present invention is to provide an assembling process for a Ravignawx type planetary gear train in which the above-described three conditions, particularly the condition No. 3, are satisfied and the transmission of power can be smoothly performed.

The present invention to resolve the above technical task is an assembling process for a Ravignawx type planetary gear train having stepped long pinions. Namely, in a Ravignawx type planetary gear train having a front and a rear sun gear which are provided coaxially, and the first, second and third stepped long pinions which are provided at angular intervals of 120 degrees around said front and said rear sun gear and directly or indirectly meshed with and connected to said front and said rear sun gear, wherein each of said stepped long pinions comprises a long front and a long rear gear, a pair of adjacent tooth-forms of said long front gear are applied with marking M on the end surfaces, the middle groove of said stepped long pinion is provided with an assembling pin hole in the position at an angle of 180 degrees opposite to said marking, and a tooth-form of said long rear gear is provided with a spot facing on the end surface; an assembling process for said Ravignawx type planetary gear train having stepped long pinions comprises the following steps of: preparing a jig for assembling said stepped long pinions composing of a jig body having a boss portion in the center thereof, carrier-fixing plates provided at an angular interval of 120 degrees on the center of said boss portion and having a projection for inserting into the mounting hole of the carrier, a spot-facing plate provided between said carrier fixing plates in the direction rotated 15 degrees on the center of the support shaft mounting said first stepped long pinion and having an engaging projection for engaging with the spot facing portion of said long rear gear, and pedestals provided on the opposite side of the jig body and having sliding channels thereon along which control pins can slide and which are provided parallel to said spot facing plate and pointing respectively to each center of the other two support shafts located at an angular interval of 120 degrees on both sides of the support shaft corresponding to said spot facing plate, and assembling said stepped long pinions by inserting said control pins into said assembling pin holes drilled on the second and third stepped long pinions so that the markings of the second and third stepped long pinions may be pointing to the same direction as that of the marking of the first long pinion positioned by said spot facing plate.

According to the assembling process in use of the jig constituted as described above, the stepped long pinions disposed on the three positons are respectively aligned with the markings pointing to the same directon, and thereby the assembly of the planetary gear train for accurate meshing can be easily performed.

DETAILED DESCRIPTION OF A PREFERRED EMBODIMENT

Figure 1:
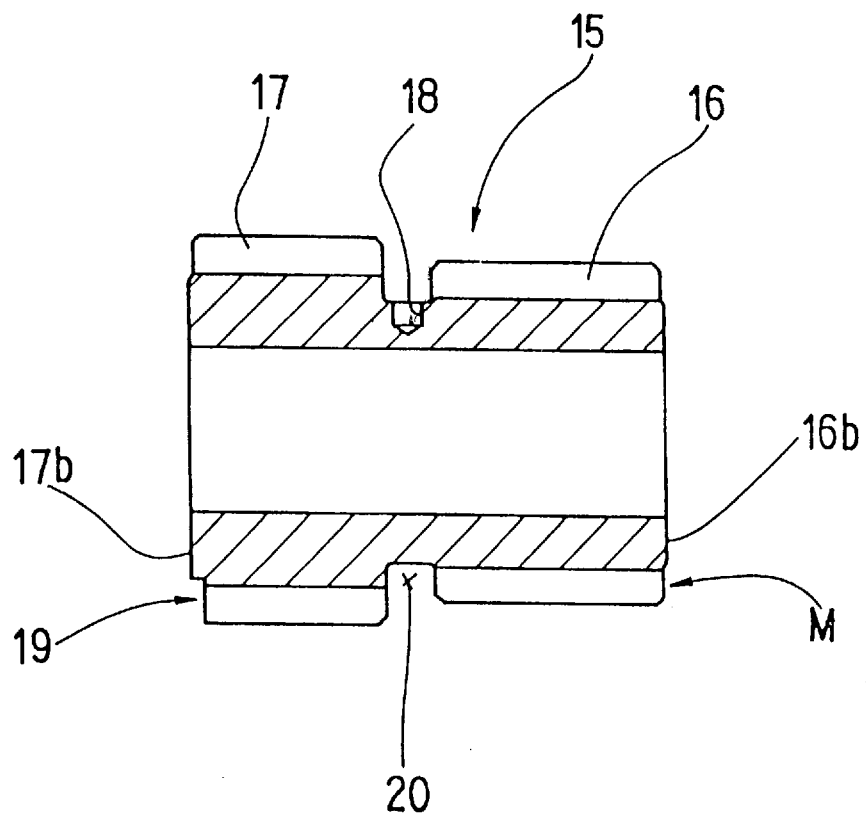
FIG. 1 is a front sectional view of a stepped long pinion.
Figure 2A:
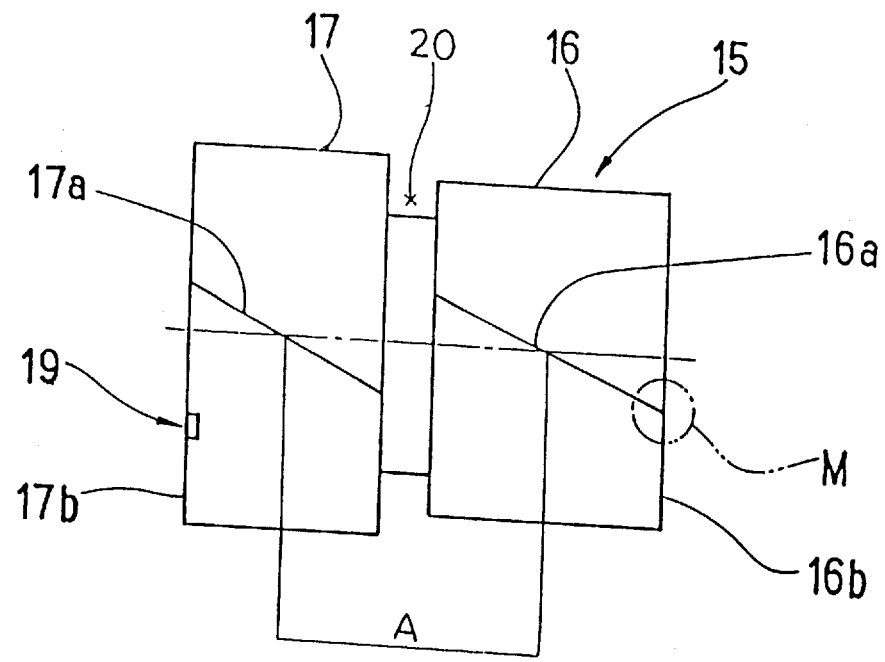
FIG. 2($a$) is a front view of the long front gear and long rear gear.
FIG. 2(b) is a front view of the tooth form applied with markings.
Figure 2B:
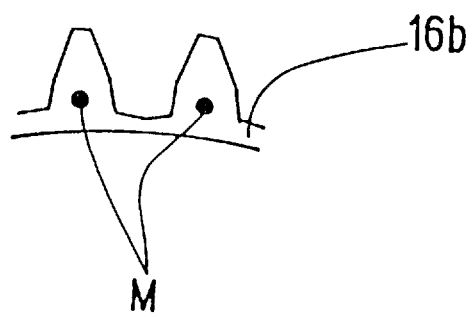
Figure 3:
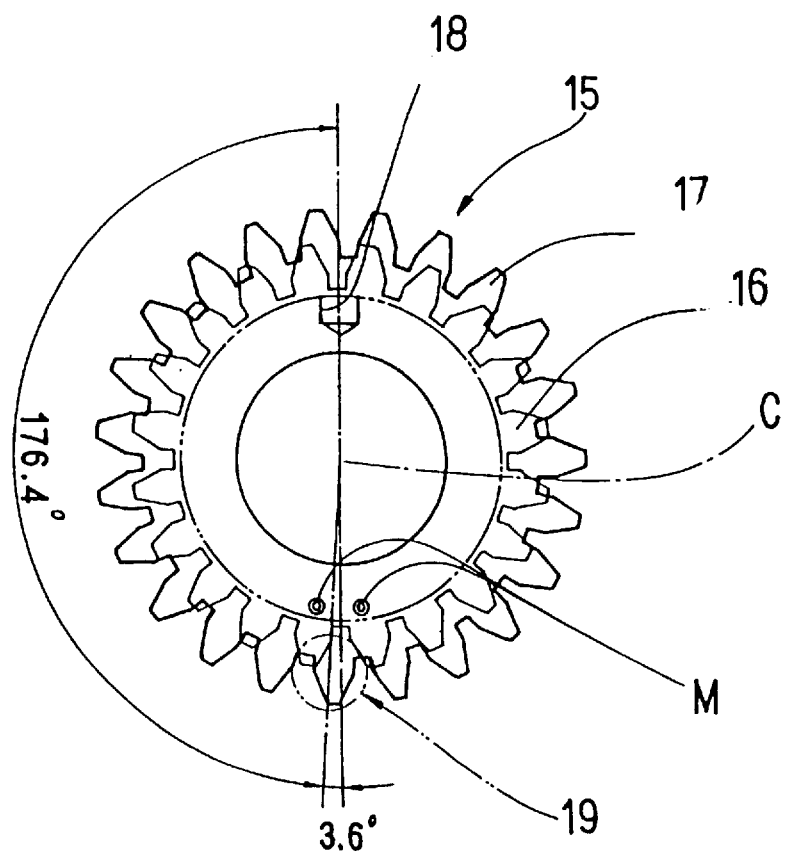
FIG. 3 is a side view of the stepped long pinion.

Referring now to the drawings, a preferred embodiment of the present invention will be described. FIG. 1 is a front sectional view of a stepped long pinion 15. FIG. 2(a) is a front view of the long front gear 16 and long rear gear 17 adjusted to the same phase at each center of the tooth width in each one of tooth grooves 16a, 17a. FIG. 2(b) is a front view of the tooth form applied with markings M. FIG. 3 is a side view of the stepped long pinion 15. In each of those stepped long pinions 15, as shown in FIG. 2(a), the long front gear 16 and long rear gear 17 are adjusted to the same phase at each center A of the tooth width in each one of tooth grooves 16a, 17a and the markings M are applied to the end surface 16b of the tooth groove 16a. In the front view of the tooth form, as shown in FIG. 2(b), the markings M are respectively located on the root portions of the teeth end 16b in the left and right sides of the tooth groove 16a of the long front gear 16.

Figure 4A:
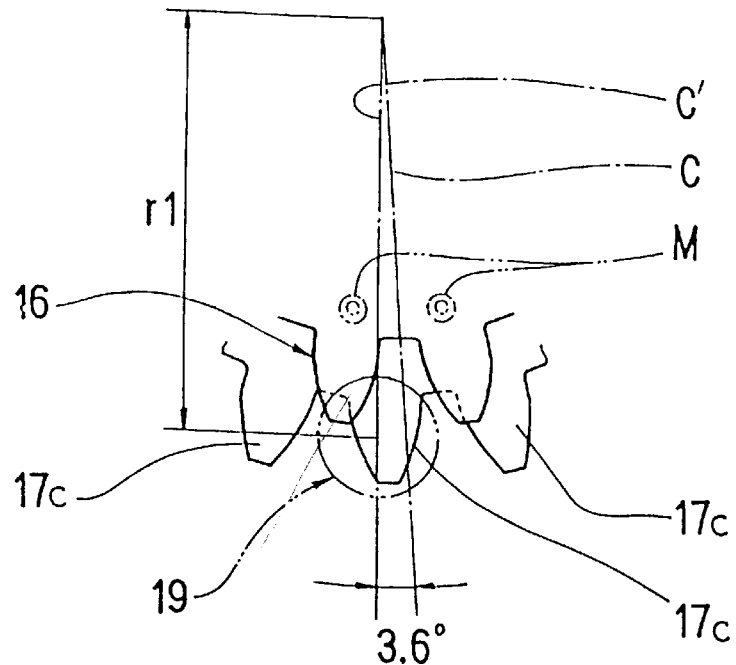
FIG. 4(a) is a front view of the tooth form provided with a spot facing.
Figure 4B:
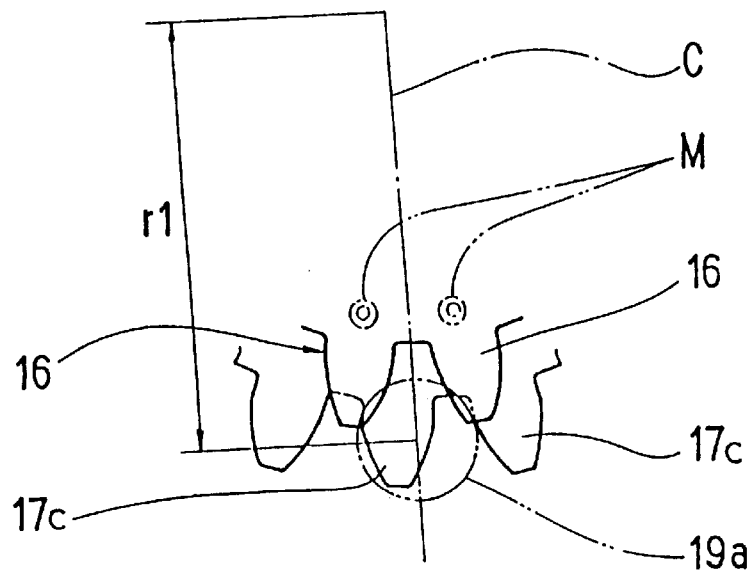
FIG. 4(b) is an illustration of the position to be applied with a spot facing.

Further, as shown in FIG. 1 and FIG. 3, an assembling pin hole 18 and a spot facing 19 are respectively provided according to those markings M as the basis. This pin hole 18 is provided in the middle channel portion 20 formed between the long front gear 16 and long rear gear 17, and drilled in a predetermined diameter (about 2 mm) on the diameter line C at an angle of 180 degrees opposite from the marking M. Also, the spot facing 19 is, as shown in FIG. 2(a) and FIG. 3, provided on the end surface 17b of the long rear gear 17 corresponding to the marking M, and machined on the tooth form 17c at an angle of 3.6 degrees shifted from the diameter line C passing through the marking M. Although this spot facing 19 should be provided on the surface just behind of the stepped long pinion opposite to the marking M, as shown in FIG. 1 and FIG. 4(b), if it is provided on the tooth form 17c corresponding to the center line C of the marking M, the range of the spot facing 19 as shown in a circular mark would machine the adjacent tooth form 17c so as to cause the occurrence of flash. On this account, the spot facing 19 is provided on the position of a radius r1 on the line C' at an angle 3.6 degrees shifted from the center line C, as shown in FIG. 4(a).

Although the spot facing 19 provided thus on the tooth form 17c is not located just on the center of the tooth form 17c, the tooth form 17c has a torsional angle, so that it is substantially on the center portion of the tooth form 17c considering this torsional angle.

Figure 5:
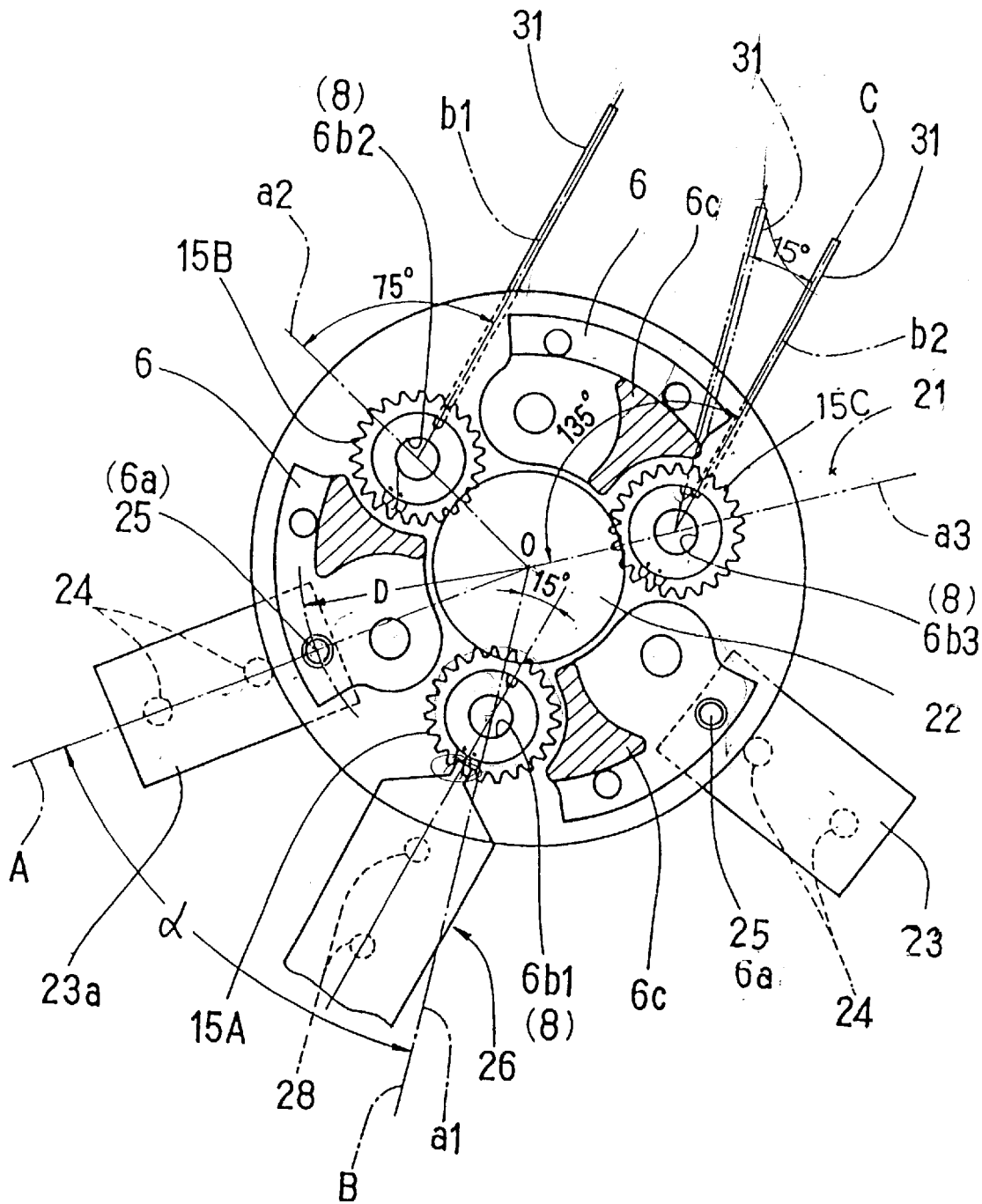
FIG. 5 is an illustration of assembling the stepped long pinions by use of the jig.
Figure 6:
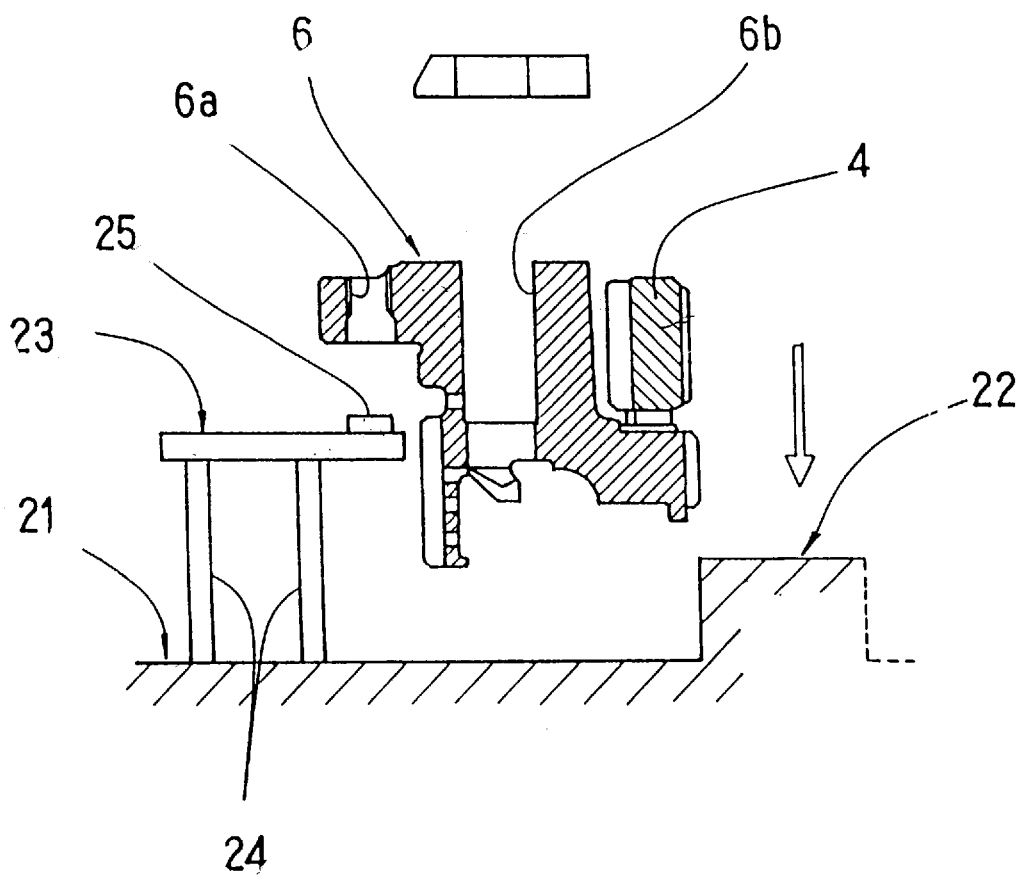
FIG. 6 is a sectional view taken on line O-A of FIG. 5.

Next, the assembly of the stepped long pinions constituted as stated above will be described. A jig 21 for assembling the stepped long pinions 15 has a boss 22 formed in the center portion thereof and carrier-fixing plates 23 provided at an angular interval of 120 degrees on the center O of the boss 22, as shown in FIG. 5 and FIG. 6. The carrier-fixing plate 23 is made in a substantially rectangular form as shown in the figure, provided with supporting posts 24 of a predetermined height aligned at a predetermined interval on the lower surface along the longitudinal center line of the plate 23, as shown in FIG. 6. Further, the plate 23 is provided with a fixing pin 25 end of the top surface for being inserted in a mounting hole 6a of a carrier 6. The fixing plates 23 thus formed are provided on the body of the jig 21 through the supporting posts 24 so that the fixing pin 25 is located at the position corresponding to the mounting hole 6a of the carrier 6 on the radius line D from the center O of the boss portion 22.

When the carrier 6 is securely mounted through the fixing pins 25 on the fixing plates 23, a shaft hole 6b1 for the support shaft 8 fitted to the stepped long pinion 15 is located at an angle of α from the center of the one fixing plate 23a, for example. Also, the other shaft holes 6b2, 6b3 are located respectively at an angular interval of 120 degree from the position of the shaft hole 6b1.

Figure 7:
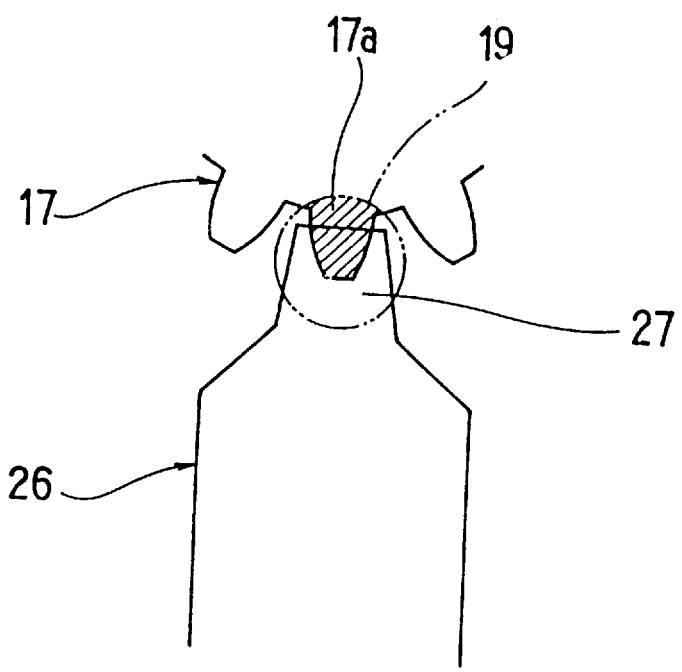
FIG. 7 is a plan view of the spot facing and the spot facing plate.
Figure 8:
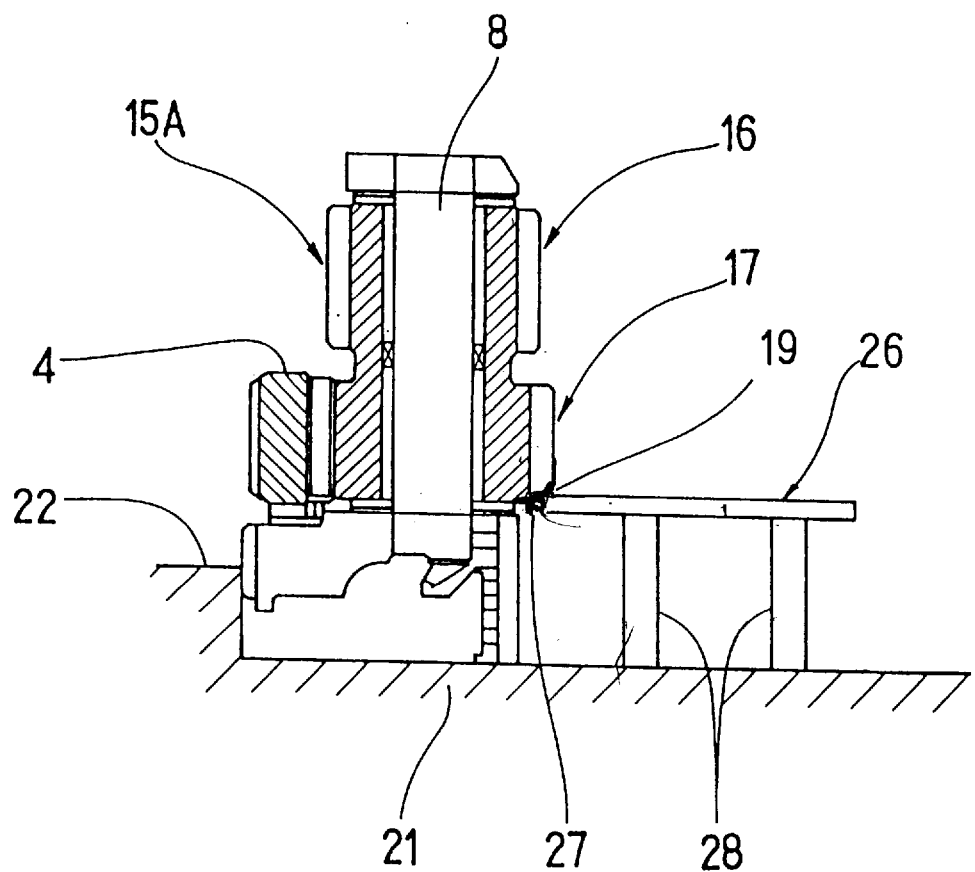
FIG. 8 is a sectional view taken on line O-B of FIG. 5.

On the position of the shaft hole 6b1 between the fixing plates 23 is disposed a spot-facing plate 26, as shown in FIG. 5 and FIG. 8. The spot-facing plate 26 is made in a substantially rectangular form similar to the fixing plate 23, provided with a tapered engaging projection 27 for engaging with the spot facing 19 formed on the end surface 17b of the tooth form 17c in the long rear gear 17 of the stepped long pinion 15, as shown in FIG. 7. This spot-facing plate 26 is provided throuth supporting posts 28 on the body of the jig 21 and located on the position at an angle of 15 degrees on the center of the shaft hole 6b1 shifted from the line a1 tying the center O of the boss 22 and that of the shaft hole 6b1 to the fixing plate 23a side. The reason of shifting the spot facing plate 26 at an angle of 15 degrees on the center of the shaft hole 6b1 from the line a1 will be described later.

Figure 9:
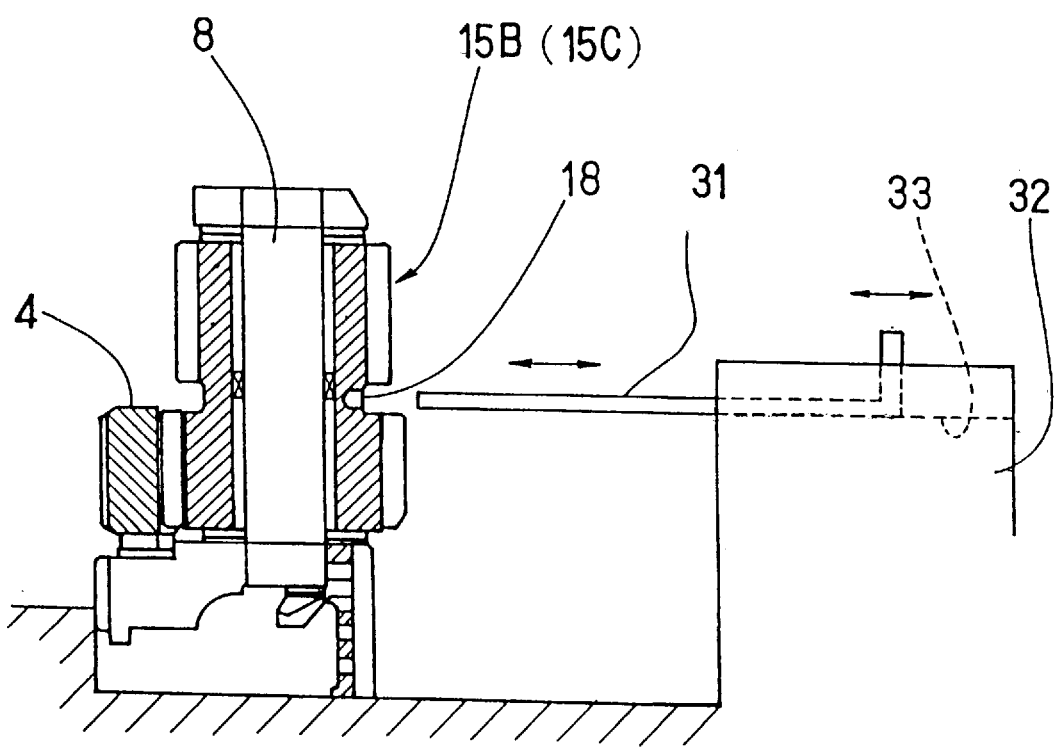
FIG. 9 is a sectional view taken on line C of FIG. 5.
Figure 10:
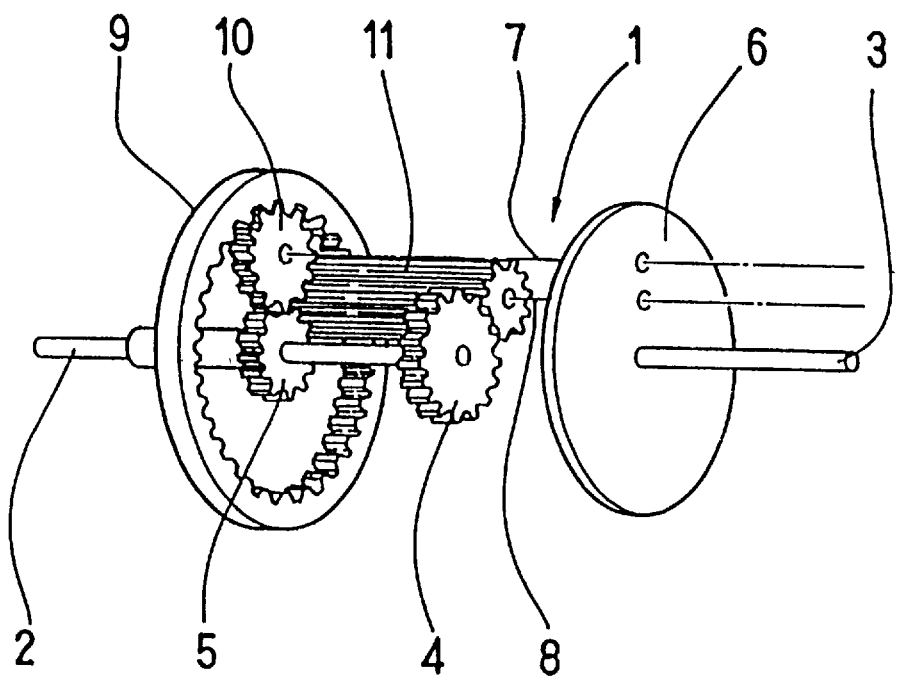
FIG. 10 is a perspective view of a Ravignawx type planetary gear train in the prior art.
Figure 11:
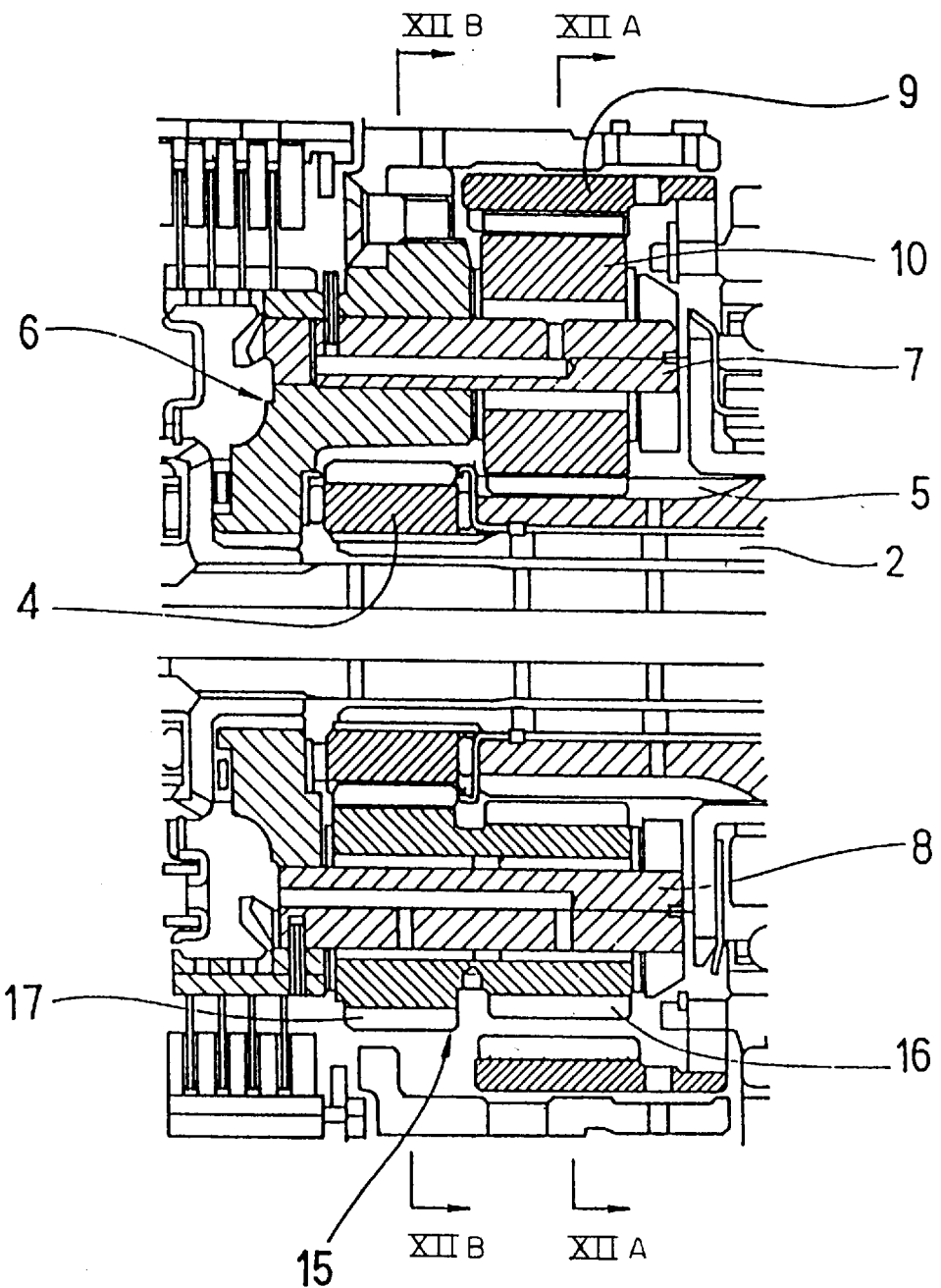
FIG. 11 is a sectional view of the planetary gear train assembled with the stepped long pinions.
Figure 12A:
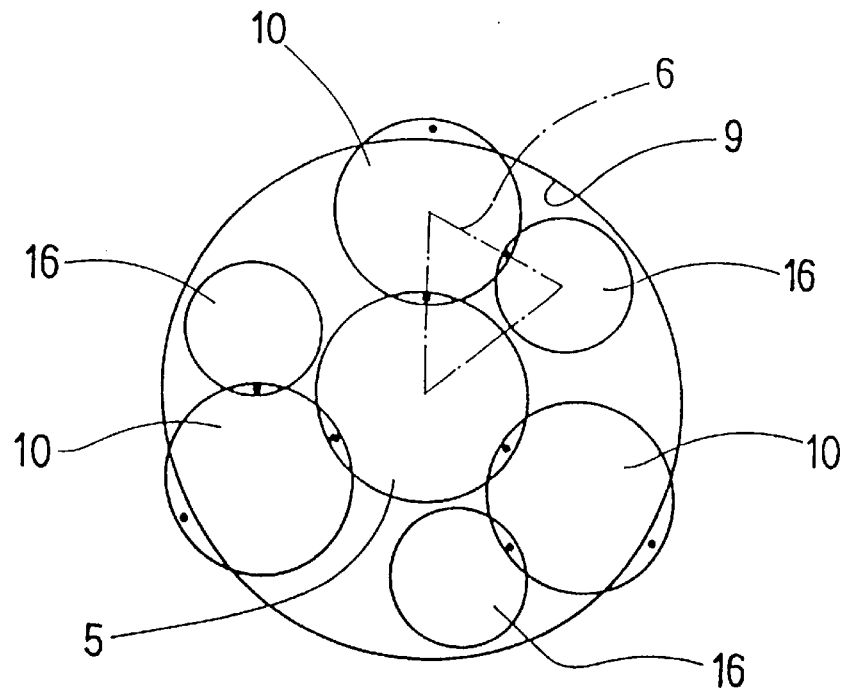
FIG. 12(a) is a sectional view taken on line XIIA—XIIA of FIG. 11.
Figure 12B:
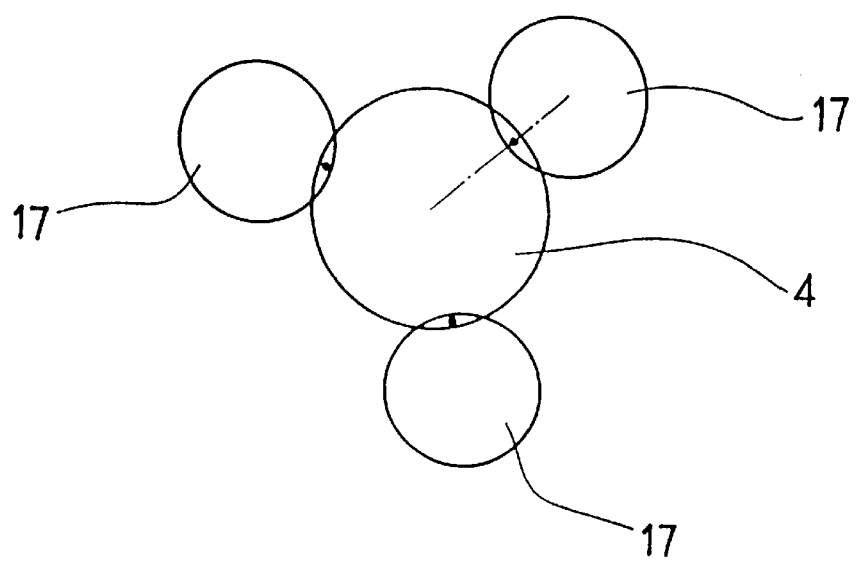
FIG. 12(b) is a sectional view taken on line XIIB—XIIB of FIG. 11.
Figure 13:
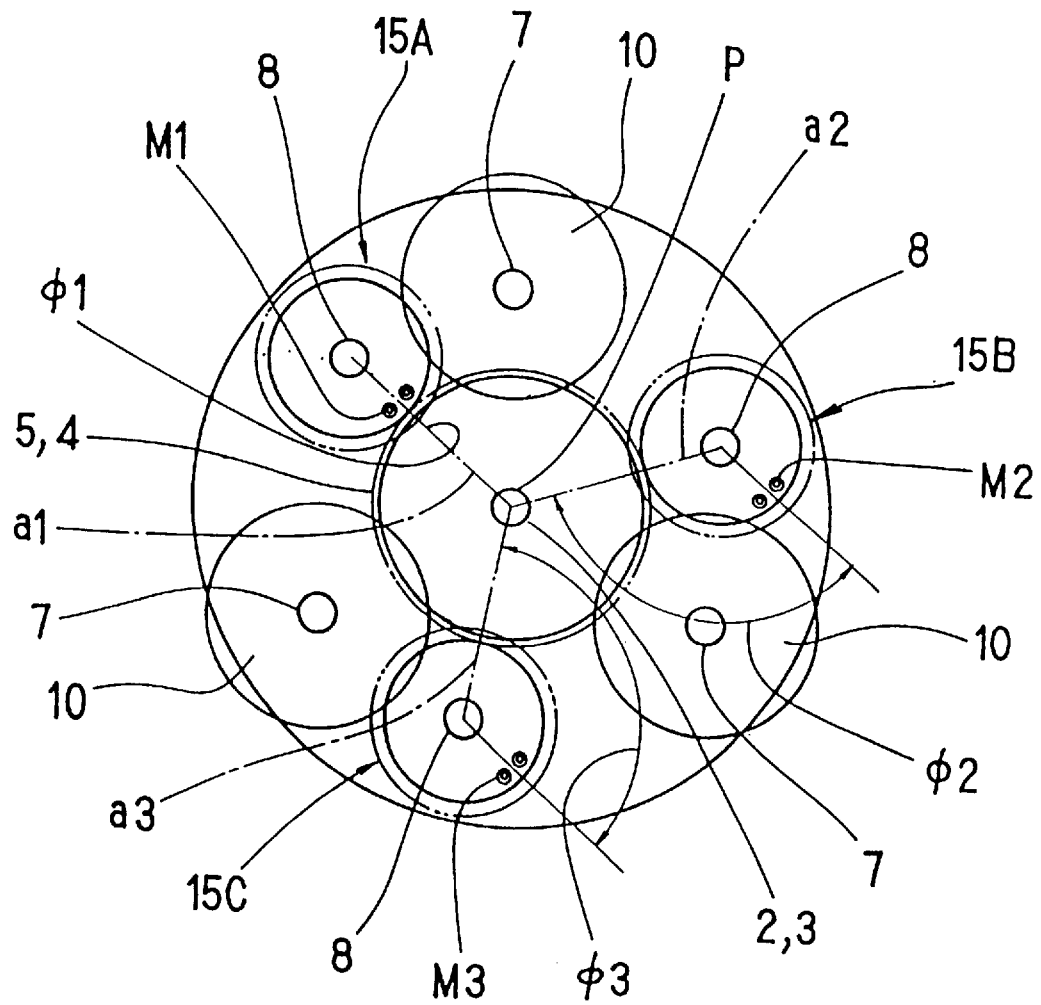
FIG. 13 is an illustration of the condition for assembling the stepped long pinions.
Figure 14:
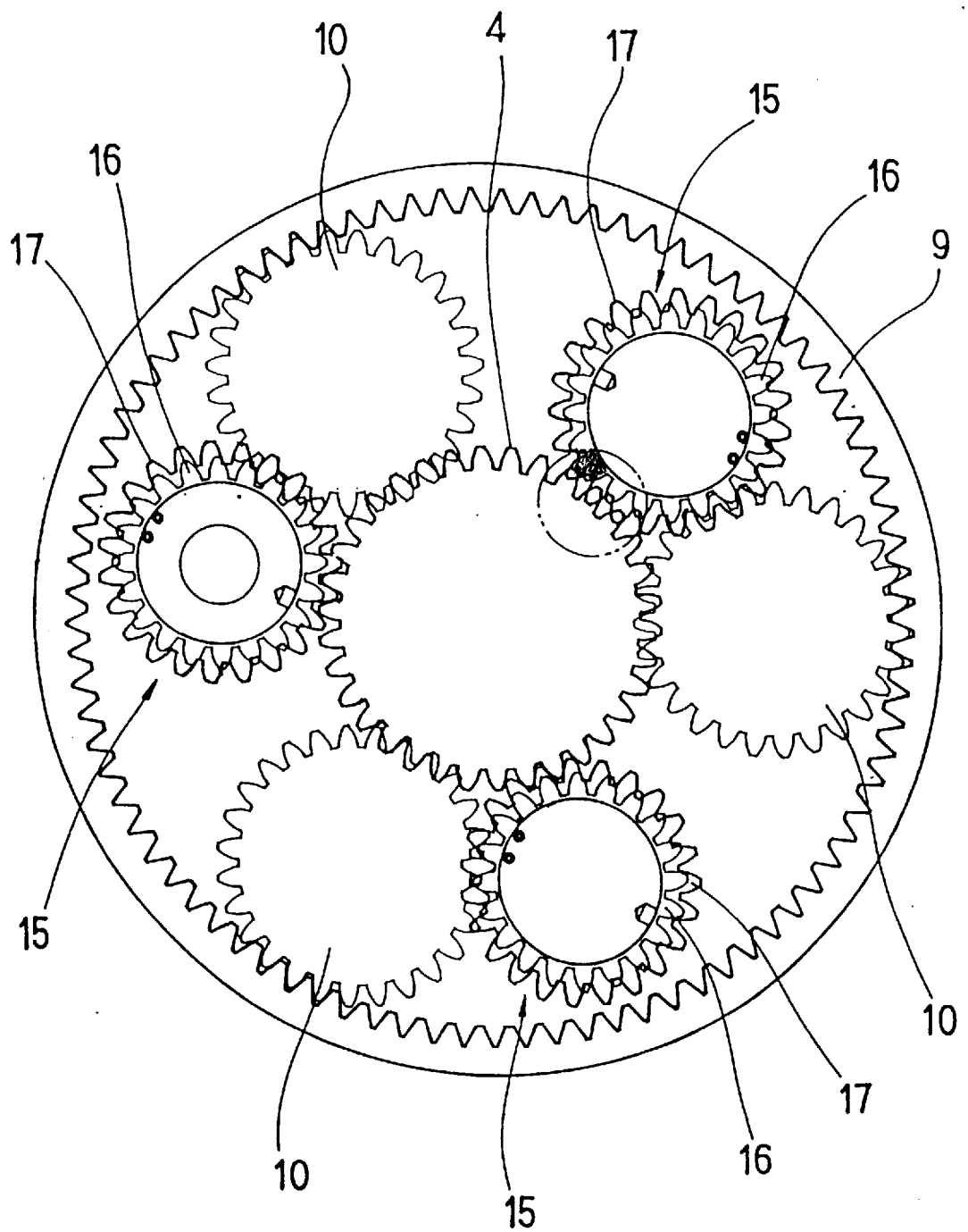
FIG. 14 is an illustration of a failing mesh of gears due to a wrong assembling condition.

To control the assembling of the stepped long pinions 15b, 15C to the shaft holes 6b2, 6b3 of the carrier 6 located respectively at an angular interval of 120 degrees from the shaft hole 6b1 disposed with the spot facing plate 26, the control pins 31 are disposed respectively pointing to the shaft hole 6b2 along the line b1 at an angle of 75 degrees shifted from the line a2 tying the center O of the boss 22 and pointing to the shaft hole 6b3 along the line b2 at an angle of 135 degrees shifted from the line a3 tying the center O of the boss 22, as shown in FIG. 5 and FIG. 9. Those control pins 31 are slidably mounted on the sliding channels 33 formed along the lines b1, b2 on pedestals 32 respectively provided along the lines b1, b2 on the body of the jig 21.

The reason for shifting the spot-facing plate 26 at an angle of 15 degrees on the center of the shaft hole 6b1 from the line a1 will be now described here. If the control pin 31 for assembling the No. 3 stepped long pinion 15C on the shaft hole 6b3 is disposed at an angular interval of 120 degrees from the line a3 tying the center O of the boss 22 and that of the shaft hole 6b3, as shown in FIG. 5, the control pin 31 would interfere with the supporting post 6c of the carrier 6. Consequently, to prevent the interference, the control pin 31 is disposed at the position shifted at an angle of 15 degrees, and as a result the spot-facing plate 26 is also shifted.

On the jig 21 thus provided is mounted the carrier 6, of which the mounting hole 6a is securely fitted to the fixing pin 25 of the carrier-fixing plate 23. In such a condition, the rear sun gear 4 is fitted to the center of the carrier 6. Then, to mesh the long rear gears 17 of the stepped long pinions 15B, 15C with the rear sun gear 4 the supporting shafts 8 are inserted respectively into the shaft holes 6b2, 6b3. At this time, the stepped long pinions 15B, 15C are meshed with and connected to the rear sun gear 4 as those pinions are adjusted up and down or left and right so as to fit the pin holes 18 drilled in the middle holes 20 of those pinions 15B, 15C to the control pins 31 slidably provided on the pedestals 32. Next, into the shaft hole 6b1 is inserted the stepped long pinion 15A and simultaneously the long rear gear 17 is meshed with and connected to the rear sun gear 4 as the spot facing 19 formed on the end surface 17b of the long rear gear 17 is engaged with the engaging projection 27 formed on the tip end of the spot facing plate 26. Thus, the condition of meshing with and connecting to the periphery of the rear sun gear 4, the stepped long pinions 15A, 15B, 15C are respectively assembled while the markings M applied to those pinions are pointing in the same direction.

Thus, through the carrier-fixing plates 23, control pins 31 and spot-facing plate 26, the stepped long pinions 15A, 15B, 15C are respectively meshed with and connected to the rear sun gear 4 and by inserting the supporting shafts 7 into the other shaft holes 6c1, 6c2, 6c3 of the carrier 6, the short pinions 10 are respectively meshed with and connected to the front sun gear 5 and the long front gears 16 so as to perform the easy assembly satisfying the three conditions.

Incidentally, in the above description the stepped long pinions 15B, 15C are previously positioned through the control pins 31, and thereafter the stepped long pinion 15A is positioned to be set. However, it is not intended to limit this process, and the reverse process may be allowable.

According to the present invention, through the carrier-fixing plates, control pins and spot-facing plate, the long rear gears of the stepped long pinions are respectively meshed with and connected to the rear sun gear and the short pinions are respectively meshed with and connected to the front sun gear and the long front gears. Thus it is made possible to perform the easy assembly satisfying the three conditions for proper meshing of the gears.

What is claimed is:

1. A method for assembly of a Ravignawx type planetary gear train which includes a front sun gear (5) and a rear sun gear (4) disposed coaxially along an axis, said front sun gear being forward relative to the rear sun gear; first, second and third stepped long pinions (15A, 15B and 15C) disposed at angular intervals of 120 degrees about the axis of the front and rear sun gears; each of the long pinions including a long front gear (16), a long rear gear (17) and a middle channel portion (20) which is provided between the long front gear and the long rear gear, the long front gear and the long rear gear engaging the front sun gear and the rear sun gear, respectively, said method comprising:

a) providing markings M on end surfaces of two adjacent teeth of the long front gear of each of the long pinions, providing an assembling pin hole (18) in the middle channel portion (20) in a position of 180 degrees from the markings M about an axis of the long front gear and providing a spot facing (19) on an end surface of one tooth of the long rear gear in a position substantially in alignment with the markings M;

b) providing a jig (21) which includes a central boss portion (22);

c) providing carrier-fixing plates (23) and (23a) at an angular interval of 120 degrees about a center (0) of the boss portion of the jig, each of the carrier-fixing plates including a projection (25);

d) providing a carrier (6) which includes mounting holes (6a) for inserting the projection so as to fix the carrier in a position relative to the fixing plates (23) and (23a), the carrier including shaft holes (6b1, 6b2 and 6b3) disposed at intervals of 120 degrees for receiving shafts (8) of the long pinions;

e) fitting the rear sun gear (4) in the center of the carrier (6);

f) placing a spot-facing plate 26 on the jig in a position between the carrier-fixing plates, the spot facing plate including an engaging projection (27) for engaging the spot-facing (19) of the long rear gear (17), the engaging projection (27) being positioned on a line relative to a diameter (a1) of the shaft hole (6b1) which line is inclined at an angle of 15 degrees from the diameter (a1) of the shaft hole (6b1) passing the center (0) of the boss portion;

g) providing pedestals (32) on the jig (21), the pedestals supporting control pins (31) such that the control pins are slidably movable in directions toward each of the shaft holes (6b2 and 6bS), respectively, and inserting each of the control pins into the assembling pin holes (18) of the long pinions;

h) meshing the long pinions (15B) and (15C) with the rear sun gear (4) and adjusting the positions of the long pinions (15B) and (15C) until the control pins (31) are inserted into the assembling pin holes (18) of the long pinions (15B) and (15C); and i) meshing the long pinion (15A) with the rear sun gear (4) and adjusting the position of the long pinion (15A) until the spot-facing (19) of the long rear gear (17) is engaged by the engaging projection (27) of the spot-facing plate (26), said method resulting in an assembly with proper meshing of the gears.

2. A method for assembly of a Ravignawx type planetary gear train which includes a front sun gear 5 and a rear sun gear 4 disposed coaxially along an axis, said front sun gear being forward relative to the rear sun gear; first, second and third stepped long pinions (15A), (15B) and (15C) disposed at angular intervals of 120 degrees about the axis of the front and rear sun gears (5) and (4); each of the long pinions (15A), (15B) and (15C) including a long front gear (16), a long rear gear (17) and a middle channel portion (20) which is provided between the long front gear and the long rear gear, the long front gear and the long rear gear engaging the front sun gear and the rear sun gear, respectively, said method comprising:

a) providing markings (M) on end surfaces of two adjacent teeth of the long front gear of each of the long pinions, providing an assembling pin hole (18) in the middle channel portion (20) in a position of 180 degrees from the markings (M) about an axis of the long front gear and providing a spot facing (19) on an end surface of one tooth of the long rear gear in a position substantially in alignment with the markings (M);

b) providing a jig (21) which includes a central boss portion (22);

c) providing carrier-fixing plates (23) and (23a) at an angular interval of 120 degrees about a center (0) of the boss portion of the jig, each of the carrier-fixing plates including a projection (25);

d) providing a carrier (6) which includes mounting holes (6a) for inserting the projection so as to fix the carrier (6) in a position relative to the fixing plates (23) and (23a), the carrier including shaft holes (6b1), (6b2) and (6b3) disposed at intervals of 120 degrees for receiving shafts (8) of the long pinions;

e) fitting the rear sun gear (4) in the center of the carrier (6);

f) placing a spot-facing plate (26) on the jig (21) in a position between the carrier-fixing plates, the spot facing plate including an engaging projection (27) for engaging the spot-facing (19) of the long rear gear (17), the engaging projection (27) being positioned on a line relative to a diameter (a1) of the shaft hole (6b1) which line is inclined at an angle of 15 degrees from a diameter line (a1) of the shaft hole (6b1) passing the center (0) of the boss portion;

g) providing pedestals (32) on the jig, the pedestals supporting control pins (31) such that the control pins are slidably movable in directions toward each of the shaft holes (6b2) and (6bS), respectively, each of the control pins (31) becoming inserted into the assembling pin holes (18) of the long pinions;

h) meshing the long pinion (15A) with the rear sun gear (4) and adjusting the position of the long pinion (15A) until the spot-facing (19) of the long rear gear (17) is engaged by the engaging projection (27) of the spot-facing plate, i) meshing the long pinions (15B) and (15C) with the rear sun gear (4) and adjusting the positions of the long pinions (15B) and (15C) until the control pins (31) are inserted into the assembling pin holes (18) of the long pinions (15B) and (15C); said method resulting in an assembly with proper meshing of the gears.

3. A method for assembly of a Ravignawx type planetary gear train having a front sun gear and a rear sun gear arranged along a first axis; first, second and third stepped long pinions provided at angular intervals of 120 degrees around the front and rear sun gear and meshed for connecting the front and rear sun gears, wherein the stepped long pinions have a long front gear and a long rear gear with a spot-facing, a pair of adjacent tooth-forms of the long front gear are applied with markings on the end surfaces, the middle groove of said stepped long pinion is provided with an assembling pin hole in the position at an angle of 180 degrees opposite to said marking, and a tooth-form of said long rear gear is provided with a spot facing on the end surface; said method comprising the following steps:

providing a jig which includes a central base portion, carrier fixing plates at 120 degree angular intervals from the center of the boss portion, the fixing plates having a projection, a carrier mounted on each fixing plate, a carrier having a mounting hole for insertion of the projection and shaft receiving holes disposed at 120 degree intervals;

inserting the shafts of each rear sun gear into a shaft receiving hole;

placing a spot-facing plate with a projection on the jig at a position between two of the carrier-fixing plates;

providing pedestals on the jig for supporting control pins on the pedestals so that the control pins are slidably movable in the direction of the shaft receiving holes;

meshing the first and second long pinions with the rear sun gear and adjusting the positions of the first rear and second pinions until the control pins are inserted into assembling pin holes of the first and second long pinions;

meshing the third long pinion with the rear sun gear and adjusting the position of the third long pinion so that the spot-facing of the long rear gear is engaged by the engaging projection of the spot facing plate;

said steps resulting in an assembly with proper meshing of the gears.

4. The method of assembly according to claim 3 wherein the step of placing a spot-facing plate includes engaging the spot-facing of the long rear gear so that the projection is positioned on a line of a shaft hole which line is inclined at an angle of 15 degrees from a diameter passing the shaft hole and the center of the boss portion.

* * * * *